W. S. WARNOCK.
CLUTCH AND TRANSMISSION.
APPLICATION FILED MAR. 7, 1921.

1,432,432.

Patented Oct. 17, 1922.
4 SHEETS—SHEET 1.

Inventor:
Wallace S. Warnock
by Dyrenforth, Lee, Chritton & Wiles, Attys

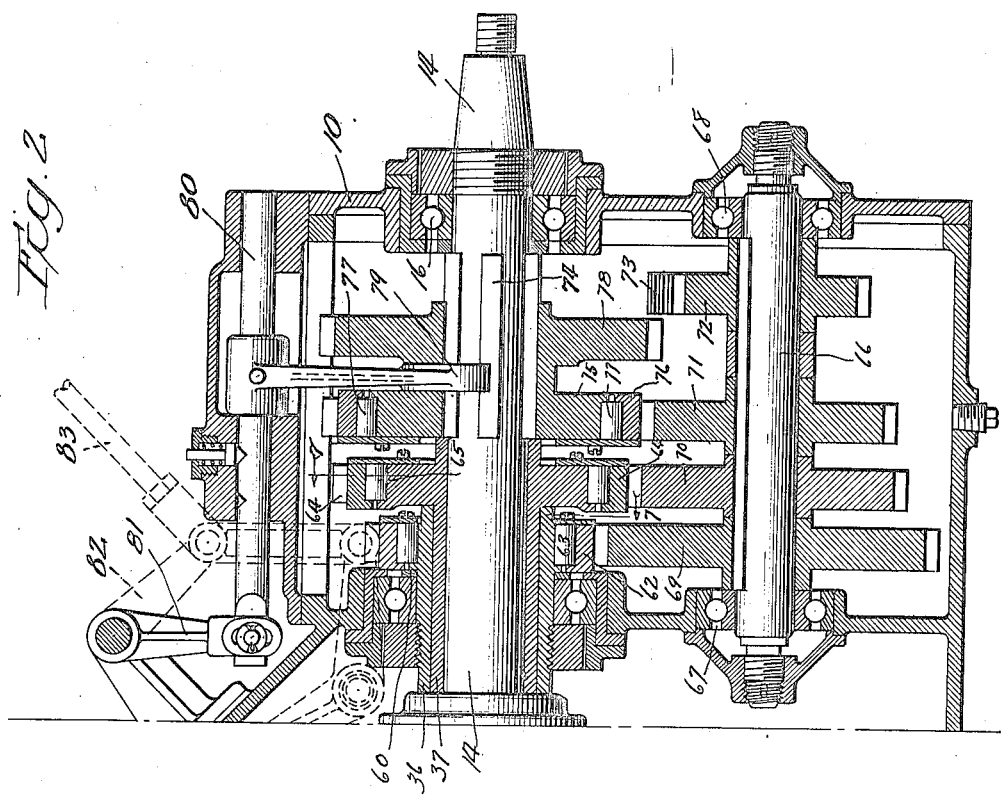

W. S. WARNOCK.
CLUTCH AND TRANSMISSION.
APPLICATION FILED MAR. 7, 1921.
1,432,432.
Patented Oct. 17, 1922.
4 SHEETS—SHEET 3.
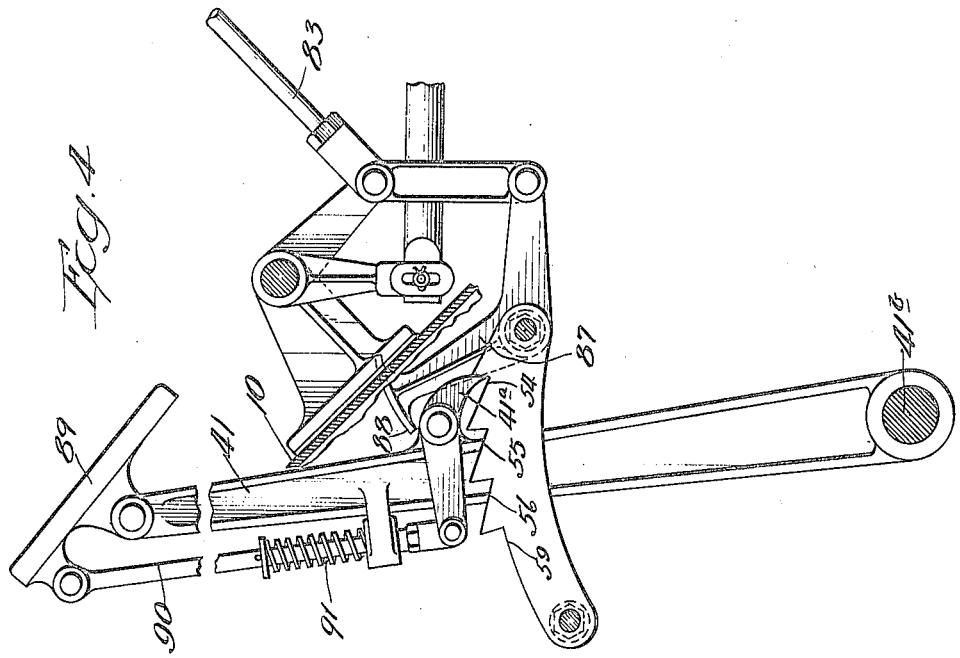
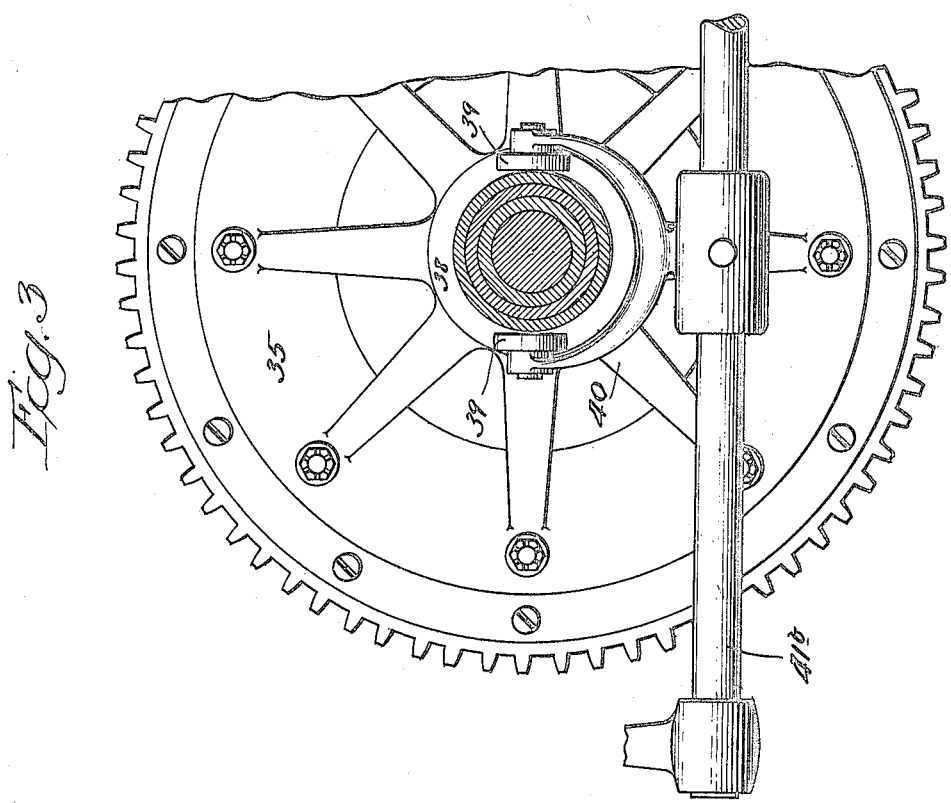
Inventor:
Wallace S. Warnock W. S. WARNOCK.
CLUTCH AND TRANSMISSION.
APPLICATION FILED MAR. 7, 1921.
1,432,432.
Patented Oct. 17, 1922.
4 SHEETS—SHEET 4.
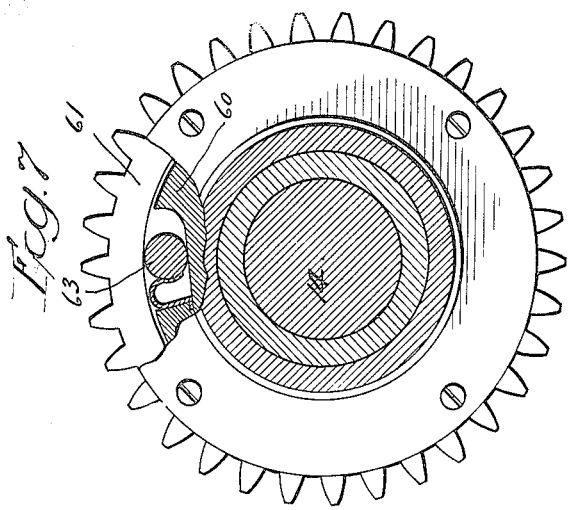
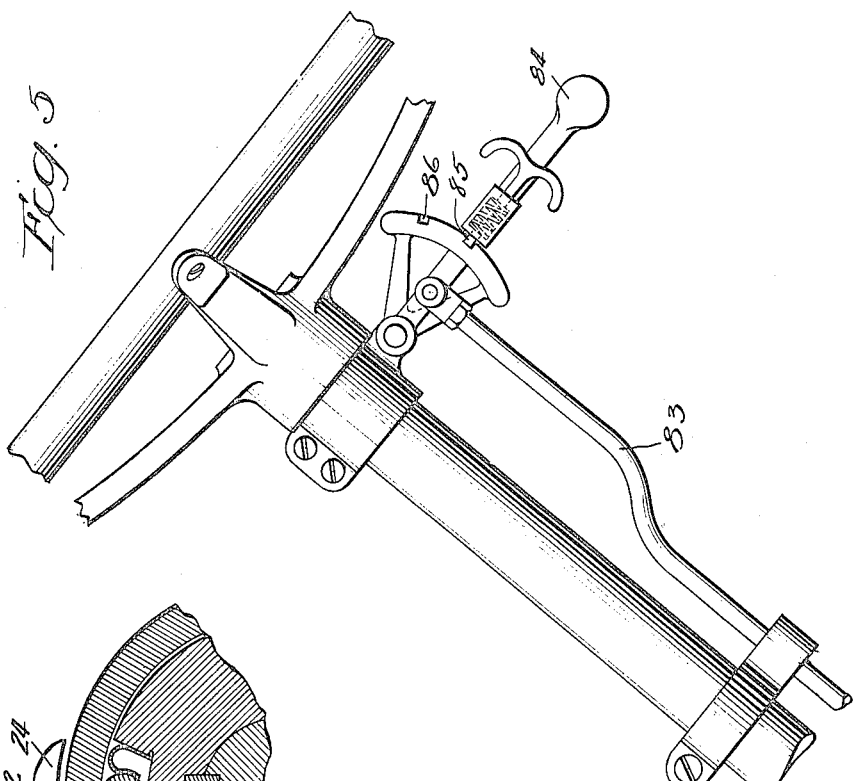
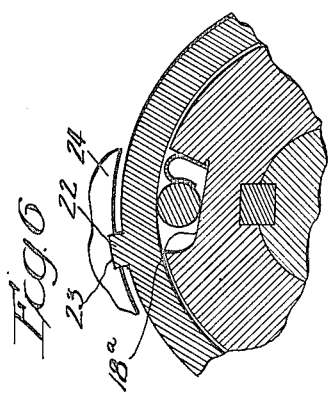
Inventor:
Wallace S. Warnock
by Dyrenforth, Lee, Chritton & Wiles, Attys Patented Oct. 17, 1922.

1,432,432

UNITED STATES PATENT OFFICE.

WALLACE S. WARNOCK, OF CHICAGO, ILLINOIS, ASSIGNOR TO ISREAL GROLLMAN, OF CHICAGO, ILLINOIS.

CLUTCH AND TRANSMISSION.

Application filed March 7, 1921. Serial No. 450,158.

*To all whom it may concern:*

Be it known that I, WALLACE S. WARNOCK, a citizen of the United States, residing at 7726 East Lake Terrace, Chicago, in the county of Cook and State of Illinois, have invented a new and useful Improvement in Clutches and Transmissions, of which the following is a specification.

This invention relates to a clutch and transmission which is fully described in the following specification and shown in the accompanying drawings, in which:

Fig. 2 is a vertical longitudinal section through the transmission and is a continuation of Fig. 1;

Fig. 3 is a partial section on the line 3 of Fig. 1;

Fig. 4 is an elevation of the clutch operating mechanism;

Figure 1:
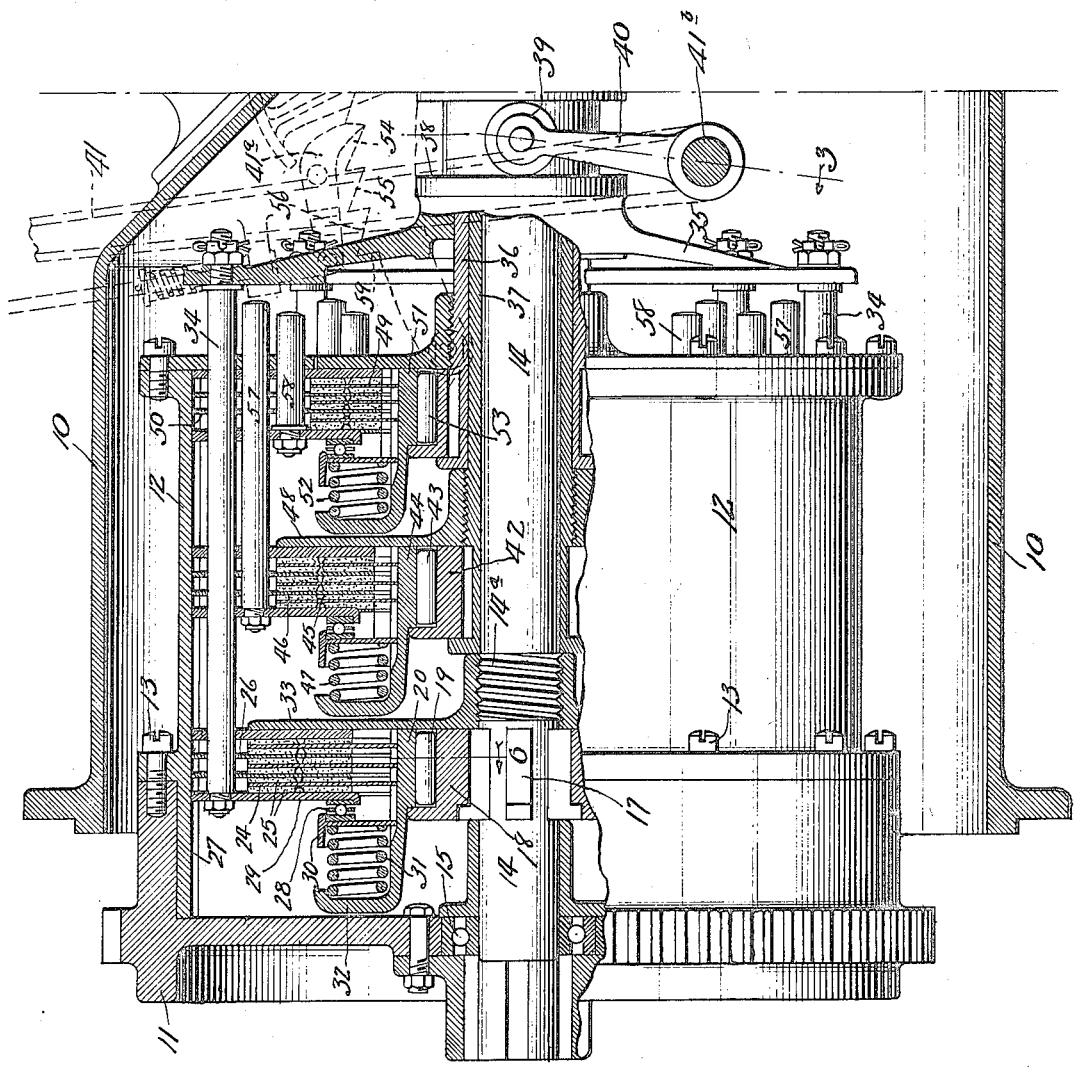
Figure 1 is a partial vertical longitudinal section through the clutch mechanism.

Fig. 5 is a partial side elevation of the steering column showing the reversing lever; and Figs. 6 and 7 are partial sections on the lines 6 and 7 of Figs. 1 and 2 respectively.

The device is illustrated as enclosed within a transmission housing 10. The engine fly wheel 11 has a clutch case 12 secured thereto by means of screws 13. A shaft 14 is journalled within the fly wheel 11 in the bearing 15, the opposite end of this shaft being journalled in the bearing 16 which is carried by the rear end of the housing 10.

The shaft 14 is provided with shouldered keys 17 upon which is mounted the inner member 18 of an overrunning clutch having a roller 19 which is adapted to roll upon the inclined surface 18ª as shown in Fig. 6 and is normally pressed upwardly against the outer clutch member 20 by means of a spring 21. When the inner clutch member 18 is held against rotation, the roller 19 will permit the outer clutch member to turn in a clockwise direction but a slight movement of the outer clutch member in a counterclockwise direction will cause the roller 19 to roll up along the inclined plane 18ª thereby locking the inner and outer clutch members 18 and 20 together.

The outer clutch member has a series of splines 22 which are engaged by notches in the notches 23 in the clutch disks 24, to which are riveted brake linings 25. The outer clutch disks 26 are placed between the inner disks 24 and these have notches in their peripheries which permit them to slide upon the splines 27 which are formed within the clutch case 12.

A ball thrust bearing 28 is provided between the end disk 29 and the flanged washer 30. A series of springs 31 are provided between the flanged washer 30 and the projection 32 which is secured to the outer clutch member 20. The pressure of the spring 31 when applied to the clutch disks is taken by the flanged plates 33 which has a threaded hub which engages corresponding threads 14ª on the shaft 14. A series of plungers 34 are secured to the end disk 29 and to the operating plate 35, which is slidably mounted upon the concentric sleeves 36 and 37, the latter being journalled upon the shaft 14. The operating plate 35 has a shoulder 38 upon which bear the rollers 39 which are carried by the bifurcated arms 40, and which are operated, as will later be described, by means of the foot lever 41, secured to the shaft 41ᵇ.

In a like manner the sleeve 37 has keyed thereto an inner clutch member 42 of an overrunning clutch which has a roller 43 which is driven by the outer clutch member 44 when the latter moves in a counterclockwise direction but which permits relative movement when the outer member is moved in a clockwise direction with respect to the inner clutch member 42. Inner and outer disks 45 and 46 are similarly carried upon the outer clutch member 44 and the splines 27 of the clutch case 12 respectively. These disks are normally pressed together by means of springs 47, the thrust of which is taken by the plate 48 which is screwed to the sleeve 37.

The inner and outer clutch disks 49 and 50 are similarly carried by the outer clutch member 51 and the clutch case 12 respectively and are normally held in contact by means of a series of springs 52. An overrunning clutch having rollers 53 is provided as previously described.

As shown in Fig. 1 the foot lever 41 is shown in the last notch 54 which corresponds to third or high speed and all of the three sets of clutch disks are in engagement. As the foot lever 41 is moved to the left to the second notch 55 which corresponds to second or intermediate forward speed, the plate 35 will move forward until it nearly touches the operating pins 57 of the second clutch, at the same time compressing the springs 31 of the first clutch causing the latter to be disengaged. As the foot lever 41 is moved still further so that the dog 41$^a$ engages notch 56, the operating pin 57 will be moved compressing the springs 47 and releasing the second clutch. A still further movement of the operating lever 41 will cause the plate 45 to move the pins 58 thereby compressing the springs 52 and releasing the third clutch. The dog 41$^a$ will then engage the notch 59 which, as will later be seen, corresponds to the neutral position of the translation, all of the clutches having been disengaged.

The sleeve 36 carries the inner member 60 of an overrunning clutch, upon the outer member 61 of which is formed the teeth of a gear 62. A series of rollers 63, as shown in Fig. 7, serve to drive the gear 62 when the inner clutch member 60 is driven in a counter-clockwise direction but permit relative movement of the clutch members when there is relative motion in the reversed direction.

The sleeve 37 has a gear 64 which is similarly mounted thereon and is driven by means of a series of rollers 65 which permit motion between the gear 64 and the sleeve 47 as previously described in a clockwise direction.

A counter-shaft 66 is journalled in bearings 67 and 68 in the housing and has keyed thereon gears 69 and 70 which mesh with the gears 62 and 64 respectively. The counter shaft also has keyed thereon gears 71 and 72, the latter meshing with an idler gear 73 which is suitably journalled within the housing.

The shaft 14 has a series of splines 74 upon which slides a cone 75 carrying a gear 76 which meshes with the gear 71. The gear 76 is mounted upon the cone 75 by means of an overrunning clutch which is driven by means of pins 77 which operate similarly to the pins 63 and 65 previously described. The cone 75 also carries a gear 78 which is formed integrally therewith. The gear 76 is normally in mesh with the gear 71 and the gear 78 normally runs free but is adapted to be shifted so that it meshes with the idler 73, the gear 76 at the same time becoming disengaged from the gear 71.

This shifting is accomplished by means of a fork 79 which is carried upon a rod 80 which is operated by means of the cranks 81 and 82, the rod 83 as shown in Figs. 2 and 5 and the reversing lever 84. When the reversing lever is raised so that the pin 85 engages the notch 86, the gear 78 will be in mesh with the idler 73 and the gear 76 will become disengaged from the gear 71.

In order to prevent the lever 84 from being moved into reversing position with the clutches in second or third speed, I have provided a safety device as shown in Fig. 4 which consists of a bell crank 87 which has a finger 88 which engages the pawl 41$^a$ when it is in intermediate or high speed, so that the bell crank 87 and consequently the rod 83 cannot be moved to reversing position as long as the pawl 41$^a$ is in either of these positions.

The pawl 41$^a$ is operated from the foot pedal 89 by means of a rod 90 and the pawl is normally held in engagement with the teeth of the quadrant by means of the spring 91.

The method of operation is as follows: With the foot lever 41 moved so that the pawl 41$^a$ engages the notch 59, the pins 34, 57, and 58 are all shoved inwardly by the plate 35 and all of the clutches are disengaged, and the shaft 14 remains stationary. With the fly wheel 11 in operation, the foot lever 41 is moved so that the pawl 41$^a$ engages the first speed notch 56, the pins 58 will be released and the springs 52 will cause the clutch disks 49 and 50 to become engaged and the overrunning clutch rollers 53 will drive the sleeve 36 which in turn will drive the gear 62 through the overrunning clutch 63. The gear 62 will then turn the gears 69 and 71, the latter driving the shaft 14 through the gear 76 and the overrunning clutch pins 77. The transmission will then be operating in first speed.

With the foot lever 41 moved to intermediate speed, so that the pawl 41$^a$ engages the notch 56, the pins 57 will be released and the springs 47 will cause the clutch disks 45 and 46 to become engaged, thereby driving the sleeve 37 through the overrunning clutch pins 43. The sleeve 43 will then drive the gear 64 through the overrunning clutch pins 65 and these in turn will drive the shaft 14 through the gears 70, 71, and 76 and the overrunning clutch pins 77. During the time the sleeve 37 is being driven the overrunning clutch pins 53 of the clutch and the clutch pins 63 of the transmission gear will permit slippage between the outer and the inner clutch rings for the reason that the outer rings are then traveling faster than the inner rings.

With the foot lever 41 moved to third or high speed position, the pawl 41$^a$ will engage the notch 54 and the clutch elements will be in the positions shown in Fig. 1, with all of the clutches engaged. At this time both of the overrunning clutch pins 43 and 53 will allow slippage so that no driving action will be had through these clutches and the clutch disks 24 and 25 will do all of the driving which will be done through the overrunning clutch pins 19, thereby driving the shaft 14 direct.

It will likewise be understood that in high speed all of the transmission overrunning clutch pins 63, 65 and 77, will permit all of these clutches to overrun and no motion of these parts will take place other than that due to friction.

While I have shown and described but a single embodiment of my invention, it is to be understood that it is capable of many modifications. Changes, therefore, in the construction and arrangement may be made without departing from the spirit and scope of the invention as disclosed in the appended claims, in which it is my intention to claim all novelty inherent in the invention as broadly as possible in view of the prior art.

What I claim as new and desire to secure by Letters Patent is:

1. A combined clutch and transmission comprising a driving member, a shaft, a clutch for connecting said shaft to said driving member, a sleeve on said shaft, an overrunning clutch carried by said sleeve, a clutch connecting said overrunning clutch and driving member and transmission mechanism including an overrunning clutch between said sleeve and shaft.

2. A combined clutch and transmission comprising a driving member, a shaft within said member and in axial alignment therewith, a clutch for connecting said shaft to said driving member, a sleeve on said shaft, an overrunning clutch carried by said sleeve, a clutch connecting said overrunning clutch and driving member and transmission mechanism including an overrunning clutch between said sleeve and shaft.

3. A combined clutch and transmission comprising a driving member, a shaft, a plurality of concentric sleeves on said shaft, a clutch connecting said shaft and driving member, an overrunning clutch secured to each of said sleeves, a clutch connecting each of said overrunning clutches and driving member and transmission mechanism including an overrunning clutch between each of said sleeves and shaft.

4. A combined clutch and transmission comprising a driving member, a shaft within said member and in axial alignment therewith, a plurality of concentric sleeves on said shaft, a clutch connecting said shaft and driving member, an overrunning clutch secured to each of said sleeves, a clutch connecting each of said overrunning clutches and driving member and transmission mechanism including an overrunning clutch between each of said sleeves and shaft.

5. A combined clutch and transmission comprising a driving member, a shaft, a clutch for connecting said shaft to said driving member, a sleeve on said shaft, an overrunning clutch carried by said sleeve, a clutch connecting said overrunning clutch and driving member and transmission mechanism including an overrunning clutch, a countershaft and gears between said sleeve and shaft.

6. A combined clutch and transmission comprising a driving member, a shaft, a clutch for connecting said shaft to said driving member, a sleeve on said shaft, an overrunning clutch carried by said sleeve, a clutch connecting said overrunning clutch and driving member and transmission mechanism including an overrunning clutch, a gear driven by said last mentioned overrunning clutch, a countershaft, a gear keyed thereon meshing with said last mentioned gear and gears operably connecting said shaft and countershaft.

7. A combined clutch and transmission comprising a driving member, a shaft, a plurality of concentric sleeves on said shaft, clutches for selectively driving any one of said sleeves or shaft direct from said driving member, transmission mechanism for driving said shaft from said sleeves, said transmission mechanism including mechanism for reversing said shaft and means preventing said last named mechanism from being moved to reversing position when certain of said clutches are engaged.

WALLACE S. WARNOCK.